UNITED STATES PATENT OFFICE.

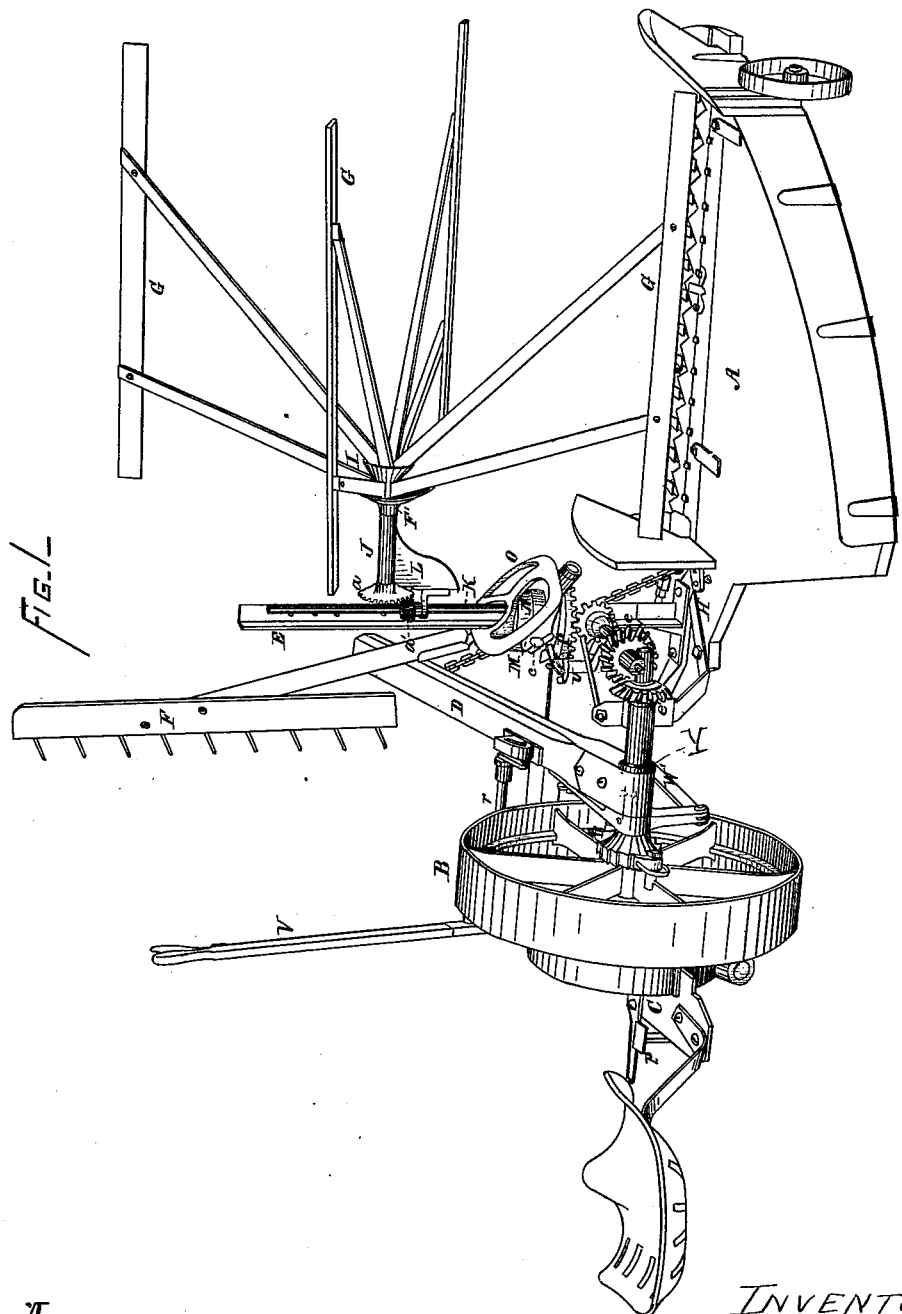

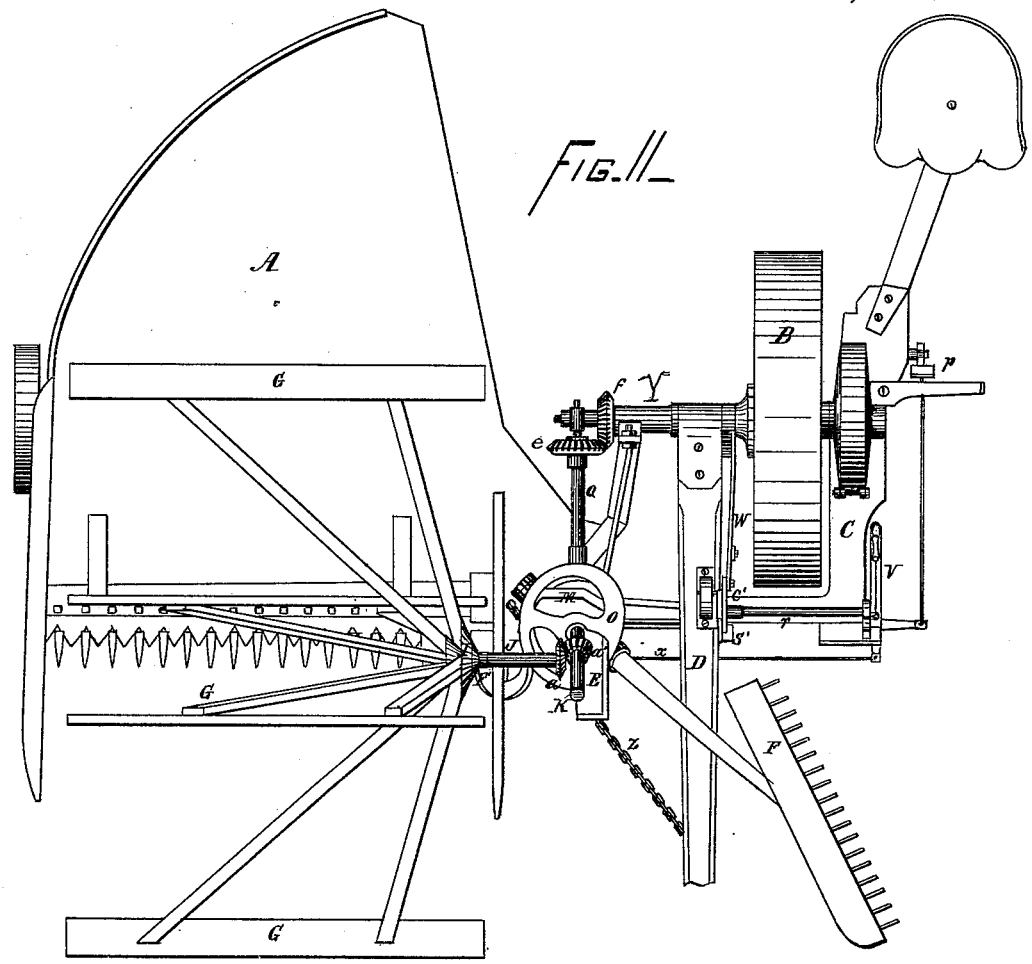

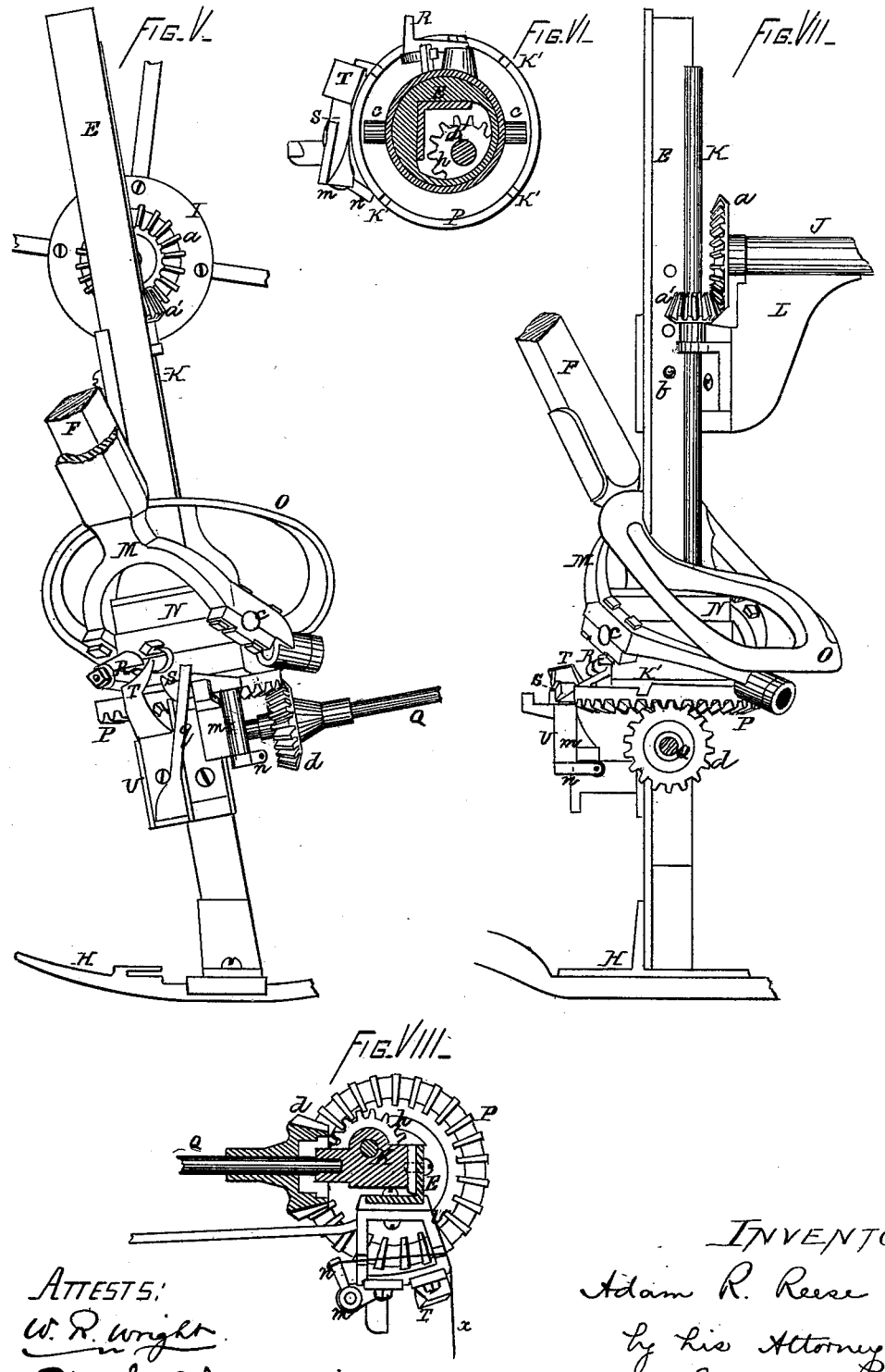

ADAM R. REESE, OF PHILLIPSBURG, NEW JERSEY.

IMPROVEMENT IN HARVESTERS.

Specification forming part of Letters Patent No. 221,422, dated November 11, 1879; application filed June 5, 1878.

*To all whom it may concern:*

Be it known that I, ADAM R. REESE, of Phillipsburg, New Jersey, have invented a new and useful Improvement in Harvesting-Machines, of which I hereby declare the following to be a full, clear, and exact description, reference being had to the accompanying drawings, which form part of this specification, and in which—

Figure 1 is a perspective view of my improved machine; Fig. 2, a plan view of the same. Figs. 3 and 4 are detached views of the lever and connections for raising or lowering the platform; and Figs. 5, 6, 7, and 8 are enlarged views of the rake and reel mechanism detached from the machine.

The same letters indicate corresponding parts in all the figures.

My invention consists in locating the main frame, together with all the gearing for driving the cutters and driver's seat, outside the main driving-wheel, by this means taking the greater part of the weight from off the platform, and in other devices, or combinations of devices, as hereinafter set forth.

By having the main carrying-wheel and the outside wheel to the platform come in line with each other the necessity of a caster-wheel, which tears up the ground in turning, is avoided.

The platform hangs upon the two axles of the main carrying-wheel and outside platform-wheel, the self-rake then resting on the finger-beam in front of the axles, and the driver sitting back of the axles on the opposite side of the main carrying-wheel. The platform is thus balanced, so that with one finger the driver can raise and lower the finger-beam and cutting apparatus while the machine is in operation.

A rod running from the whiffletrees to the front of the platform, and there fastened, also assists in taking the weight off the tongue, and reduces side draft.

The machine being front-cut permits the inside and outside dividing-boards to be alike, for picking up lodged grain. The points of each of the dividing-boards can run as near to the ground as may be desired to gather up the tangled grain, thus avoiding a common fault in rear-cut machines, where the front of the drag-shoe is necessarily elevated, and leaning grain at that point is so presented to the rake and knives that the heads only are cut off, and, being too short for gleaning, are left on the ground and wasted. The annual sum thus lost is considerable.

The main frame, main gearing, and driver's seat are all located on the outside of the main carrying-wheel, by this means taking all the weight from the platform that may be safely taken, causing the machine to be run lighter, with less side draft and less weight on the finger-beam, and obviating the liability of the finger-beam to sag or spring down in the center, which cramps the knife and causes the machine to run hard.

This construction of a one-wheel front-cut machine, with the driver's seat, main frame, and main gearing located on the outside of the main carrying-wheel, so balances the machine as to throw nearly the whole weight on the main carrying and driving wheel, thus having all the power that can be desired from the machine for driving the knife and self-rake.

When the driver's seat is located outside of the main carrying-wheel and some thirty inches back of the axle, it is utterly impossible for the driver to be thrown or fall in front of the knives. If he falls he must fall clear of everything pertaining to the machine.

In the drawings, A is the platform, and B the driving-wheel, of a harvesting-machine. C is the main frame, which is supported on the axle of the driving-wheel and by the tongue D, and, together with all the gearing for driving the cutting apparatus, is located on the outside of the driving-wheel B, for the purpose heretofore set forth.

On the finger-beam H of the machine is mounted an angle-iron reel-post, E, to which the rake F and reel-arms G G, together with the gearing which drives them, are attached. The reel-arms G G, which are hung over the cutters, are attached to a spider, I, which is bolted to a collar, F', keyed to a shaft, J, driven by means of bevel-gears $a$ and $a'$ from the upright shaft K. The shaft J is supported by a sleeve formed in the upper portion of the bearing L, which bearing is secured at any desired height on the reel-post E by a bolt, $b$. The rake F is secured to a metal arm, M, which is mounted on trunnions $c\ c$ on the circular sleeve N, which fits over the angle-iron reel-post E. The path of the rake-arm F is governed by the guide O.

The main driving-gear P on the reel-post E is revolved by the pinion $d$, mounted on the shaft Q, which shaft is driven by a pinion, $e$, on its opposite end, meshing with a pinion, $e'$, on the inner end of the shaft of the main drive-wheel B.

The bevel-gear P is of peculiar construction, having, in addition to its bevel-teeth, internal teeth, which mesh into a pinion, $h$, secured to the lower end of the upright shaft K. Mounted on the sleeve N is a spring-pawl, R, which, by dropping in the notches K' K' on the upper rim of the gear P, revolves the sleeve N and rake-arm F.

S is a stop or switch, mounted on a short upright shaft which passes through the sleeve on the auxiliary standard U, secured to the main standard or reel-post by screws or bolts; and T is an overhanging catch mounted on said standard U, and having its under face inclined so as to oppose the passage of the pawl, unless the latter rests in one of the notches K'. On the lower end of the shaft carrying the stop S there is an arm, $n$, to which a cord or wire, X, is secured. This cord is carried to a foot-lever, $p$, which is attached to the main frame near the driver, so that by pressing the foot-lever $p$ he can throw the stop S outward from the gear P, and on releasing the foot-lever the spring $q$ forces the stop S back to its former position.

V is a hand-lever, provided with the usual pawl and rack segment, and secured to the rock-shaft $r$, which is at its other end jointed to an extension or arm, C', of the main frame C. This arm C' slides vertically in the guide S', fastened to the tongue D. The tongue being hinged to a sleeve, Y, on the main axle of the machine, the operator is enabled to tilt the platform to any desired angle by raising or lowering the hand-lever V, which acts upon the bars W W' W'', connected to the main axle as a fulcrum, the arm C', and the front of the platform.

The operation of my machine is as follows: The forward movement of the machine causes the reel-arms G G to revolve. The spring-pawl R dropping, as heretofore explained, in one of the notches K' on the rim of the gear P, the gear in revolving carries the rake-arm F around with it, and brings it in between two of the arms of the reel in front of the cutting apparatus. The cut grain which has accumulated on the platform is swept off by the rake, which afterward rises and is carried on until the spring-pawl R comes into contact with the stop S. The pawl R, in sliding up the inclined-plane part of the stop S, is lifted up from the notch K' on the rim of the gear P, in which it was resting. The rake-arm is now released from its revolving motion, and will remain so until the operator throws the stop S outward by pressing upon the lever V, which operation permits the spring-pawl R to descend upon the rim of the gear P, the catch T, however, preventing the rake-arm from traveling around until one of the notches K' K' reaches the spring-pawl R, which then drops into it, and carries the rake-arm with it, passing under the catch T. The rake then proceeds in its revolving motion, as before described.

By means of this arrangement the driver can regulate the size of the bundles either by permanently securing the stop S, so that the rake-arm can pass uninterruptedly around in its path, or by holding it for any desired length of time.

Z is a draft rod or chain, which is attached at one end to the whiffletrees under the tongue, and at the other end is secured to the platform inside of the dividing-board. The whiffletrees are hung under the tongue by means of a bolt passing through a slot in the tongue, the under side of which slot is lengthened to admit the raising and lowering of the tongue.

Having thus described my invention, what I claim, and desire to secure by Letters Patent of the United States, is—

1. In a one-wheel harvester, the main frame, main gearing, and driver's seat, all located and supported outside the main carrying-wheel, in combination with the support on the tongue for the front end of the main frame to regulate the height of the cut, substantially as described.

2. In a one-wheel machine, the main frame, main gearing, and driver's seat located outside the main carrying-wheel, in combination with the tongue hinged at the inner end, and a device for the front end of the main frame to slide in alongside the tongue in its upward and downward movement while being regulated to the height of cut desired.

3. The combination of main frame C, sleeve Y, platform A, tongue D, horizontal bar W, and vertical bar W' and bar W'', for supporting and regulating the height of finger-beam and platform, substantially as described.

4. The combination of the main frame, the driver's seat located back of the main axle, the tongue, the hand-lever, and the guide upon the tongue, in which the front end of the main frame slides as it is adjusted.

5. In combination with a revolving rake and its driving mechanism, a trip or switch lying normally in the path of the driving pawl or clutch, and operating to bring the rake to a full stop at the end of each revolution, and mechanism, under the control of the driver, whereby said trip or switch may be wholly removed from the path of the pawl to permit the rake to revolve continuously without interruption, substantially as described.

6. The combination of the revolving rake, notched gear P, spring-pawl R, and stop S, under control of the driver, substantially as described.

7. The combination of the revolving rake, notched gear P, spring-pawl R, catch T, and stop S, substantially as described.

ADAM R. REESE.

Witnesses:
W. R. WRIGHT,
JOEL ZANE.